United States Patent Office

3,219,115
Patented Nov. 23, 1965

3,219,115
WATER SOLUBLE SOLID FOAMING
COMPOSITION
Wayne F. Hower and John A. Knox, Duncan, Okla.,
assignors to Halliburton Company, Duncan, Okla., a
corporation of Delaware
No Drawing. Filed June 26, 1962, Ser. No. 205,223
13 Claims. (Cl. 166—45)

The present invention relates to a new and improved foaming composition and more particularly to a completely water soluble solid or stick composition which produces quantities of foam when mixed with water.

Certain surface active agents or surfactants which cause water to foam when agitated with air or gas have found a number of uses in the oil producing industry. To enable these surfactants to be quickly and easily introduced into a well bore or placed in a well, they have been molded in the form of a long stick. This permits the surfactant to be dropped through pipes of various sizes.

It has also been customary to add to or mix with the surfactant a heavy solid material such as barite or barium sulfate, ferric oxide and lead oxide and the like to make the stick heavier so that it will fall through brines normally encountered in the wells.

These weighted foam producing sticks are especially useful in rejuvenating water-logged gas wells by a technique well known in the art and which is described in a co-pending application, Serial No. 73,546 and now Patent No. 3,155,178.

These sticks have also been used with considerable success in a number of instances, but there are times in which it is undesirable to use the water insoluble barites or oxides. One example of such an undesirable use is in the use of surfactant sticks in water injection wells wherein the barite or oxide could have a tendency to plug some of the flow channels.

It has been discovered that a heavy surfactant material which is completely water soluble can be prepared by mixing certain water soluble compounds with a solid surfactant.

The primary object of this invention is to provide a new and improved stick or solid foaming composition which is completely soluble in water and which is heavy enough to be dropped to a predetermined location or area in a well bore.

Another object of the present invention is to provide a new and improved solid foaming composition which is particularly adapted for use in water injection wells.

Still another object of the present invention is to provide a new and improved solid foaming composition wherein the foaming of the surfactant used therein is enhanced.

A further object of the present invention is to provide a new and improved solid foaming composition which more effectively removes oil from solid surfaces thereby providing a better cleaning action.

Still a further object of the present invention is to provide a new and improved foaming composition which also accomplishes a water treatment by more effectively water wetting solid surfaces and sequestering certain scale forming ions in the water.

Other objects and advantages of the present invention will become more readily apparent from the description hereinafter presented.

The present invention is a foaming agent for both fresh water and salt water, and is principally adapted for helping remove water from drowned or partially drowned gas wells. In its preferred form, the foamer or foaming agent is a weighted cylindrically shaped solid. Although its diameter and length may be varied as desired, a stick having a diameter of 1¼ inches and a length of 18 inches has been found to be quite practical.

The solid stick form is especially adapted to keep the foaming agent intact until it reaches the desired water area when it is dropped through a conduit such as tubing or the like. This solid form of foamer decreases the chances of waste as compared with a liquid poured in at the well head. As the weighted solid falls through the water when dropped into the well, a more efficient mixing with a water column is obtained.

The dispersing or intermixing of the surfactant of the foam stick with water standing in the bottom of the well causes the water column to commence foaming when there is agitation by gas or air. The removal of water from the well in the form of suds reduces the hydrostatic head. The chances of an increase in gas production are improved considerably as the pressure across the producing zone is lessened by the lowered water column.

With a sufficient gas production increase, the sudsing becomes intensified until the well substantially unloads. During this unloading process, oil, paraffin, silt and the like are often removed from the formation bore face as a result of the detergency action of the suds or foamer. These particles are held in suspension in the sudsing water or brine until removed.

In addition to foaming water from gas wells, the present invention is particularly effective in treating water injection and disposal wells. The physical form of the invention facilitates the application thereof in concentrated form to a contaminated zone at the bottom of a well.

In performing these various functions the present invention has a further advantage over prior art foamers in that the water soluble weighting agent in the cylinder or stick, enhances the foaming properties, makes the stick completely water soluble and aids in sequestering scale foaming ions.

Another important use of the present invention is in swabbing wells. Here the foaming agent acts as a lubricant, thereby extending the life of the swab cups. In addition, the sticks of the present invention increase the efficiency of the cleaning action of the swab.

The present invention consists essentially of a foam producing surface active agent and a water soluble weighting material compatible therewith which are blended or mixed together and compacted together in a predetermined or desired geometric configuration.

Any water soluble organic or inorganic material which is a solid at normal temperatures and which does not form a precipitate with calcium, magnesium, sulfate or hydroxyl ions may be used in the present invention as the weighting material. It is preferred that this material also have sequestering or chelating properties and the ability to water wet formations.

The metaphosphates, polyphosphates, pyrophosphates, and molecularly dehydrated phosphates are particularly desirable as weighting materials because of their desirable sequestering properties and for economic reasons. Some examples of these phosphates are sodium heptametaphosphate, sodium hexametaphosphate, sodium acid pyrophosphate, sodium tripolyphosphate, tetrasodium pyrophosphate, potassium acid pyrophosphate, potassium tripolyphosphate, tetrasodium pyrophosphate, potassium hexametaphosphate, and potassium heptametaphosphate. Other sodium, potassium and alkali metal polyphosphates may also be used. The polyphosphate or phosphate used in the present invention is generally preferably one which does not dissolve too slowly, but the more slowly soluble polyphosphates may be used if desired, and in some instances may even be preferred. U.S. Patent No. 2,370,472 describes a number of polyphosphates and phosphates of the more preferred higher solubility in water as well as others which can be used, but are generally not as desired because of their slower rates of solubility. It is well within the skill of one skilled in the art to choose a phosphate or polyphosphate having a desired rate of water solubility.

Other solid materials suitable for use in the present invention are the solid inorganic and organic acids such as sulfamic acid, citric acid, gluconic acid and the like.

Chelating agents such as ethylenediamine tetraacetic acid, hydroxyethylethylendiamine triacetic acid, diethylentriamine pentaacetic acid, nitrilotriacetic acid, dihydroxyethylglycine, and the sodium potassium and ammonium salts thereof may also be used as the weighting material phase of the present invention.

Some examples of inorganic solids which may be used as weighting materials, but which do not have the preferred chelating or sequestering properties, are sodium chloride, sodium nitrate, sodium nitrite, sodium acetate, sodium chromate, sodium citrate, potassium chloride, potassium nitrate, potassium nitrite, potassium acetate, potassium chromate, potassium citrate, ammonium chloride, ammonium nitrate, ammonium nitrite, ammonium acetate, ammonium chromate, ammonium citrate, and the like. Solid sodium hydroxide and potassium hydroxide may also be used.

It can readily be seen from the disclosure above that a wide variety of weighting materials may be used without departing from the scope of the invention. The weighting material selected should not materially detract from the foaming properties of the surfactant mixed therewith.

A wide variety of surfactants may be used as the foaming agent in the present invention. A nonionic type surfactant which has good foaming properties in both fresh water and brines normally found in oil wells is particularly satisfactory.

U.S. patent application Serial No. 73,546 discloses a number of types and examples of each of a number of surfactants which may be used in the present invention. Some nonionic surfactants are the polyoxyethylated higher aliphatic alcohols such as tridecyl alcohol, cetyl alcohol, stearyl alcohol, hexadecyl alcohol, lauryl alcohol, oleyl alcohol, mixtures thereof and similar fatty alcohols having from 12–24 carbon atoms.

Polyoxyethylated alkyl phenols are also desirable foaming agents. Some examples of these are hexyl phenol, octyl phenol, nonyl phenol, dodecyl phenol, dihexyl phenol, dioctyl phenol, dinonyl phenol, didodecyl phenol, and mixtures thereof. The alkyl phenols wherein one alkyl group is in the para position with respect to the hydroxy groups of the phenol are especially preferred in this group.

Some additional examples of surfactants which may be used in the present invention are anionic surfactants, some examples of which are alkyl aryl sulfonates, alkyl sulfonates, aryl sulfonates, alkyl aryl sulfates, alkyl aryl phosphates, alkyl phosphates, aryl phosphates, and the sodium, potassium and ammonium salts of each. Some specific examples of these surfactants are dodecyl benzene sulfonate, octadecyl sulfonate, napthalene sulfonate, octaphenol sulfate, lauryl sulfate, tetradecyl sulfate, napthalene sulfate, dodecyl benzene phosphate and mixtures thereof.

Some examples of cationic surfactants are the high molecular weight fatty quaternary ammonium chlorides such as dodecyl benzene trimethylammonium chloride, tallow trimethylammonium chloride, didodecyl dimethylammonium chloride and mixtures thereof.

In addition to the surfactants above, amphoteric surfactants such as N-substituted amino acids and salts like N-lauryl, myristyl beta amino propionic acid and sodium N-cocoa beta-amino propionate, may also be used.

Other surfactants which have foaming properties are the polyoxyethylated tallow amides and the polyoxyethylated fatty acids.

It can therefore readily be seen that a wide variety of surfactants or surface active agents which produce foam upon agitation may be used without departing from the scope of the present invention.

One specific form of the present invention using a sodium heptametaphosphate and a nonionic surfactant having good foaming properties is in a cylindrical stick form, 1¼ inches in diameter and 18 inches in length. It has a specific gravity of about 1.2 or higher with a melting point range of from 130° F. to 135° F. This stick falls through water or condensate at a rate of approximately 100 feet per minute and is completely dissolved within one hour at room temperatures. This particular stick will drop between 3000 feet and 5000 feet through water before completely dissolving. It should be noted, however, that the buoyant effect of produced gas moving up the tubing of the well will retard the falling rate, depending upon the amount of gas being produced from the well.

Field testing has demonstrated the effectiveness of the new and improved sudsing or foaming stick.

A well in southwest Texas with zero well head pressure purged its water column with one stick of the present invention of the size as stated above. The well head pressure leveled off at 840 p.s.i.

Another well in this area was producing 600 MCF of gas a day but it would load up with water and die. Four sticks were dropped down the tubing and the production increased to 800 MCF after the water was foamed out.

Another gas well completed with a tubing pressure of 900 p.s.i. had dropped to 700 p.s.i. This well was treated with one stick of the present invention of the size as stated above. After cleaning out a considerable amount of water, mud and oily materials, it is now producing at 1020 p.s.i. well head pressure.

Recently an injection well in North Texas was treated with two sticks. Prior to treatment, the well would take only two b.w.p.d. at 380 p.s.i. After treatment, the injection rate increased to 280 b.w.p.d. with a slight decrease in injection pressure.

Sticks of ¾ inch diameter have been successfully used in three Hugoton pay gas wells in Kansas. These wells ranged from 2650–2700' with a bottom hole temperature of approximately 85° F. and rock pressures of 300 p.s.i. Each of these wells had loaded up with salt water and both the 1¼ inch siphon string and the casing were dead.

Three sticks were placed in the siphon strings of each well and left overnight. Fluid in the annulus and tubing was rocked back and forth until the wells kicked off through the tubing. The well was then blown until it dried up.

It should be noted that the above examples are by way of illustration only and that the amounts of the weighted materials and surfactants as well as the particular size, shape and form of the present invention may be varied as desired without departing from the scope of the present invention.

U.S. application Serial No. 73,546 illustrates amounts of surfactants and weighting materials which may be used in the present invention.

The present invention is also applicable in a gas drilling process where subsurface water has invaded the drilling zone in the well bore. The drilling solids and water may be removed from the drilling zone by adding thereto a water soluble solid foaming agent, passing compressed gas at high velocity into the drilling zone thereby creating an aqueous foam, and then returning the gas with the foam and entrained solids to the surface through the well bore.

The present invention is further applicable in a mist drilling process. In such a process, a well bore is drilled with a rotary drilling tool and a water soluble solid foaming agent is supplied to the drilling zone. Subsequently gas at high velocity is supplied to the drilling zone, thereby creating an aqueous foam. The gas with the foam and entrained solids is returned to the surface through the well bore.

In a well drilling operation wherein cuttings produced by a rotating drill bit positioned at the lower end of a string of drill pipe are brought to the earth's surface by entrainment in a stream of gas injected into the bottom of the well through the drill pipe, the cuttings tend to accumulate in the well in the presence of subterranean water. This subterranean water may be removed by adding a completely water soluble foaming agent to the gas stream when the subterranean water is encountered. The water is thereby caused to foam and is circulated at a rate sufficient to remove it to the earth's surface.

Broadly, the present invention relates to a new and improved completely water soluble solid foaming agent for use in removing water from subterranean earth formations.

What is claimed is:

1. A process for raising water from a subterranean zone to the surface, comprising the steps of: introducing into said water a solid completely water soluble foaming composition comprising a foam producing surface active agent having a specific gravity less than that of water and a water soluble weighting material compatible therewith, mixed together and molded into a predetermined geometric configuration, said solid completely water soluble foaming composition having a specific gravity greater than that of water; and, flowing a gas through said subterranean zone and then to the surface thereby causing an aqueous foam and raising said foam to the surface.

2. A process for raising water from a subterranean zone to the surface, comprising the steps of: introducing into said water a completely water soluble foam producing solid comprising a foam producing quantity of polyoxyethylated monohydroxy hydrocarbon foaming agent having a specific gravity less than that of water having an average of more than 20 oxyethylene groups per mol, the monohydroxy hydrocarbon selected from the group consisting of monohydric, aliphatic alcohols having 12–24 carbons and alkyl phenols having 6–12 carbons in each alkyl group, and a water soluble weighting material mixed together and molded therewith, said completely water soluble foaming solid having a specific gravity greater than that of water; and flowing a gas through said subterranean zone and then to the surface to cause said water to form an aqueous foam and raise said foam to the surface with said gas.

3. The process of claim 2 wherein said water soluble weighting material is an alkali metal hydroxide.

4. The process of claim 2, wherein said water soluble weighting material is selected from the group consisting of the organic acids, the inorganic acids, inorganic salts of sodium, potassium and ammonium, and amino acid chelating agents and the sodium and potassium salts thereof.

5. A process for raising water from a subterranean zone to the surface, comprising the steps of: introducing into said water a completely water soluble foam producing solid comprising a foam producing quantity of polyoxyethylated dialkyl phenol having a specific gravity less than that of water, having an average of more than 20 oxyethylene groups per mol, and having 6–12 carbons in each alkyl group and an alkali metal polyphosphate weighting material mixed together and molded therewith, said completely water soluble foaming solid having a specific gravity greater than that of water; and flowing a gas through said subterranean zone and then to the surface to cause said water to form an aqueous foam and raise said foam to the surface with said gas.

6. A process for raising water from a subterranean zone to the surface, comprising the steps of: introducing into said water a completely water soluble foam producing solid comprising a foam producing quantity of polyoxyethylated monoalkyl phenol having a specific gravity less than that of water, having an average of more than 20 oxyethylene groups per mol, and having 6–12 carbons in the alkyl group and an alkali metal polyphosphate weighting material mixed together and molded therewith, said completely water soluble foaming solid having a specific gravity greater than that of water; and flowing a gas through said subterranean zone and then to the surface to cause said water to form an aqueous foam and raise said foam to the surface with said gas.

7. A process for raising water from a subterranean zone to the surface, comprising the steps of: introducing into said water a completely water soluble foam producing solid comprising a foam producing quantity of a polyoxyethylated monohydric, aliphatic alcohol having a specific gravity less than that of water, having 12–24 carbons having an average of more than 20 oxyethylene groups per mol and an alkali metal polyphosphate weighting material mixed together and molded therewith, said completely water soluble foaming solid having a specific gravity greater than that of water; and, flowing a gas through said subterranean zone and then to the surface to cause said water to form an aqueous foam and raise said foam to the surface with said gas.

8. In a gas drilling process where subsurface water has invaded the drilling zone in the well bore, the steps of: removing drilled solids and water from the drilling zone which comprise adding to the drilling zone a completely water soluble solid comprising a foam producing quantity of a polyoxyethylated monohydroxyhydrocarbon foaming agent having a specific gravity less than that of water having an average of more than 20 oxyethylene groups per mol, the monohydroxy hydrocarbon selected from the group consisting of monohydric, aliphatic alcohols having 12–24 carbons and alkyl phenols having 6–12 carbons in each alkyl group and an alkali metal polyphosphate weighting, chelating, sequestering and water wetting material, said completely water soluble solid having a specific gravity greater than that of water; passing compressed gas at high velocity into the drilling zone and thereby creating an aqueous foam; and, returning the gas with the foam and entrained solids to the surface through the well bore.

9. A mist drilling process comprising the steps of: drilling a well bore with a rotary drilling tool; supplying to the drilling zone a completely water soluble solid foaming agent comprising a foam producing quantity of a polyoxyethylated monohydroxy hydrocarbon foaming agent having a specific gravity less than that of water having an average of more than 20 oxyethylene groups per mol, the monohydroxy hydrocarbon selected from the group consisting of monohydric, aliphatic alcohols having 12–24 carbons and alkyl phenols having 6–12 carbons in each alkyl group and an alkali metal polyphosphate weighting material, said completely water soluble solid foaming agent having a specific gravity greater than that of water; supplying a gas at high velocity to the drilling zone, thereby creating an aqueous foam; and, returning the gas with the foam and entrained solids to the surface through the well bore.

10. A process for removing accumulated water from a subterranean gas-bearing zone which comprises the steps of: adding to the accumulated water a completely water soluble solid composition comprising a foam producing quantity of a polyoxyethylated monohydroxy hydrocarbon foaming agent having a specific gravity less than that of water having an average of more than 20 oxyethylene groups per mol, the monohydroxy hydrocarbon selected from the group consisting of monohydric, aliphatic alcohols having 12–24 carbons and alkyl phenols having 6–12 carbons in each alkyl group and a water soluble weighting material compatible therewith selected from the group consisting of the organic acids, the inorganic acids, inorganic salts of sodium, potassium and ammonium, and amino acid chelating agents and the sodium and potassium salts thereof, said completely water soluble solid composition having a specific gravity greater than that of water; and, thereafter causing gas in the formation to flow from the formation to the surface to create an aqueous foam by said gas flow and raise the accumulated water with the gas to the surface in the form of an aqueous foam.

11. The process of claim 10 wherein said water soluble weighting material is an alkali metal hydroxide.

12. The process of claim 10 wherein said water soluble weighting material is an alkali metal polyphosphate.

13. In a well drilling operation wherein cuttings produced by a rotating drill bit positioned at the lower end of a string of drill pipe are brought to the earth's surface by entrainment in a stream of gas injected into the bottom of the well through said drill pipe and wherein cuttings tend to accumulate in said well in the presence of subterranean water, the improvement which comprises adding a completely water soluble solid foaming agent having a specific gravity less than that of water to said gas stream when subterranean water is encountered, said completely soluble solid foaming agent being combined with a completely water soluble solid weighting agent to impart a specific gravity greater than that of water to said combination, forming a foam therewith, and circulating said foam in said well at a rate sufficient to remove said foam to the earth's surface.

References Cited by the Examiner
UNITED STATES PATENTS

| | | | |
|---|---|---|---|
| 3,073,387 | 1/1963 | Dunning et al. | 175—69 X |
| 3,076,508 | 2/1963 | Lissant | 166—45 |
| 3,081,267 | 3/1963 | Laskey | 252—138 X |
| 3,111,998 | 11/1963 | Crowley | 175—68 |
| 3,111,999 | 11/1963 | Lummus et al. | 175—68 |

OTHER REFERENCES

Randall, B. V., et al.: Stearates, Foaming Agents Combat Water in Air or Gas Drilling. In the Oil and Gas Journal, pp. 78–83, November 1958.

CHARLES E. O'CONNELL, *Primary Examiner.*